United States Patent
Anvari et al.

[11] Patent Number: 6,130,909
[45] Date of Patent: Oct. 10, 2000

[54] METHOD AND APPARATUS FOR EQUALIZATION IN A DIVERSITY RECEIVER

[75] Inventors: Kiomars Anvari, Alamo; Hongge Ren, Fremont; Peter Winship, Albany; Michael Parker, Antioch; Michael Kaube, Concord, all of Calif.

[73] Assignee: Transamerica Business Credit Corporation, Rosemont, Ill.

[21] Appl. No.: 09/007,991

[22] Filed: Jan. 16, 1998

[51] Int. Cl.$^7$ ............................. H04B 10/18; H04L 27/01
[52] U.S. Cl. ........................... 375/232; 375/341; 375/347
[58] Field of Search ................................. 375/232, 341, 375/347, 350

[56] References Cited

U.S. PATENT DOCUMENTS

| | | | |
|---|---|---|---|
| 5,127,025 | 6/1992 | Okanoue | 375/232 |
| 5,353,307 | 10/1994 | Lester et al. | 375/233 |
| 5,499,272 | 3/1996 | Bottomley | 375/347 |
| 5,596,607 | 1/1997 | Larsson et al. | 375/340 |
| 5,748,673 | 5/1998 | Futagi et al. | 375/232 |

OTHER PUBLICATIONS

Sirikiat Ariyavisitakul, "Equalization Of A Hard–Limited Slowly–Fading Multipath Signal Using A Phase Equalizer With A Time–Reversal Structure," *IEEE*, 1990, 520–526.

*Primary Examiner*—Don N. Vo
*Attorney, Agent, or Firm*—Townsend and Townsend and Crew LLP; Kenneth R. Allen

[57] ABSTRACT

A receiver having an adaptive maximum likelihood sequence (MLSE) estimator and method are provided, in particular in a nonlinear receiver, wherein a channel estimator is used to estimate the channel to be used in the MLSE estimator in order to minimize distortion. In the MLSE estimator, the channel estimation is extracted from the phase of the signal using a known training sequence pattern in the received data frame. The channel estimation is adaptively updated using a Least Mean Square (LMS) algorithm by applying tentative decision in the received signal.

2 Claims, 4 Drawing Sheets

METHOD AND APPARATUS FOR EQUALIZATION IN A DIVERSITY RECEIVER

BACKGROUND OF THE INVENTION

The present invention relates to receivers and methods for receiving digital radio signals while minimizing distortion, particularly in receivers with hard limiting circuits, and the application of equalizer techniques in wireless telecommunication systems, especially mobile communication systems.

Equalizers are used to eliminate distortion in various receivers. Equalizers are typically used in linear receivers where signal amplitude and phase are preserved.

In the presence of frequency selective fading an equalizer is useful to improve receiver performance. The structure of the equalizer depends on the type of receiver front end. In linear receivers, samples contain channel information. Examining this information can provide an accurate channel estimate for equalization. On the other hand, non-linearity at the front end simplifies the receiver design since channel information is stripped from the amplitude of the received signal. Therefore information can be examined by analyzing with the received signal strength intensity (RSSI) signal or by extracting information from the received signal phase.

There are three types of equalizers: a linear equalizer, a decision feedback equalizer (DFE), and a maximum likelihood sequence estimator equalizer (MLSE). Linear equalizers are not suitable for channels with frequency selective fading, since such fading amounts to significant noise enhancement.

Moreover, decision feedback equalizers do not attempt to compensate for the effect of distortion which might be done by using a cascaded adaptive FIR filter. Instead a nonlinear structure is used to remove the effect of post:cursor intersymbol interference distortion by using previous decisions and a feedback filter. In a decision feedback equalizer, the noise enhancement is less than that of the linear equalizer.

SUMMARY OF THE INVENTION

According to the invention, a receiver having an adaptive maximum likelihood sequence (MLSE) estimator and method are provided, in particular in a nonlinear receiver, wherein a channel estimator is used to estimate the channel to be used in the MLSE equalizer in order to minimize distortion. In the estimator, the channel estimation is extracted from the phase of the signal using a known training sequence pattern in the received data frame. The channel estimation is adaptively updated using a Least Mean Square (LMS) algorithm by applying tentative decision in the received signal.

In a particular embodiment, the MLSE equalizer receives an input signal sample which has been selected by a timing recovery algorithm followed by a smoothing filter. The combined function of the timing recovery and smoothing filter is to find the input signal sample which produces the optimum eye opening. The output of the smoothing filter is also used to select a second sample which can be used for time diversity reasons where two parallel MLSE equalizer paths, one using the main sample and the other using the diversity sample, are performed, so the results are combined and used for the final detection of data.

Also in a specific embodiment, the receiver includes a main receiver and a diversity receiver, and the MLSE equalizer operation is controlled by a smart switch which chooses one of the receivers based on an algorithm which uses the receive signal strength intensity (RSSI). In such a case, the MLSE equalizer starts by using the training sequence of the preferred receiver for channel estimation and, if the switch decides to use the other receiver before the frame is finished, the MLSE uses the detected data for channel estimation. The number of times that the MLSE equalizer switches from one receiver to another depends on the frame duration.

In still another embodiment, the receiver includes a main receiver and a diversity receiver, and the MLSE equalizer uses the training sequence of each receiver to estimate its associated channel. The individual channel estimations, receive signal strength intensity (RSSI), and the input signal samples of each receiver are delivered to the MLSE equalizer for data detection. The MLSE process is applied to individual channels independently, and for tentative and final decision making, the result is based on two paths linearly combined. Time diversity as described hereinabove can be further applied to each channel.

A receiver structure having the MLSE equalizer can be effective in the presence of multipath distortion. It could be used to estimate the transmitted data by maximizing the likelihood function. The MLSE equalizer according to the invention is superior to the prior configurations for some of the following reasons:

it is closer to an optimum receiver structure;

it is more robust against error propagation;

it has better performance in case of nonminimum phase channels;

it has overall better performance compared to a DFE of comparable complexity.

The invention will be better understood by reference to the following detailed description in connection with the accompanying drawings.

DESCRIPTION OF SPECIFIC EMBODIMENTS

Figure 1:
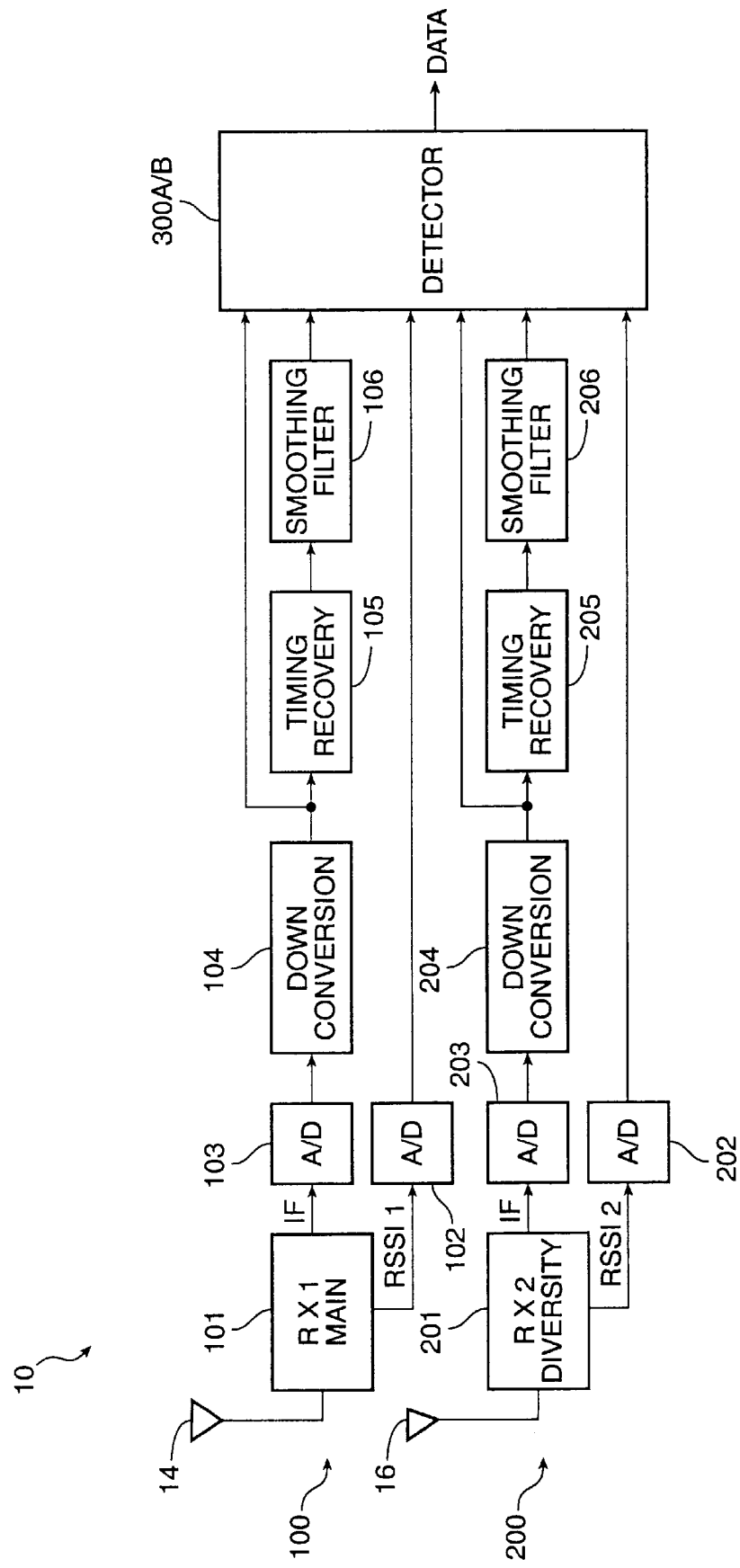
FIG. 1 is block diagram of a receiver with main and diversity branches which feed a detector using a Maximum Likelihood Sequence Estimator (MLSE) for data recovery.

In a first embodiment of the invention, and referring to FIG. 1, a nonlinear receiver 10 with main branch 100 and diversity branch 200 uses a detector 12 which can operate on one branch only, the best branch being selected based on a selection algorithm, and both branches using a linear MLSE combiner, as hereinafter explained. In FIG. 1, receiver modules 101 and 201 in respective first and second branches 110, 200 are of the hard limited type in order to avoid the need for Automatic Gain Control (AGC) circuits and the complications in amplitude tracking associated therewith. However, the system can work with other types of receiver modules which are not so signal limited.

In operation, the received signal from antenna 14 is processed in receiver module 101. The output of the receiver module 101 is digitized by the analog to digital converter 103 before being down converted to baseband by downconversion subsystem 104. The downconverted signal is applied to the timing recovery subsystem 105 and also the data detector subsystem 300A/B in which is an MLSE element as hereinafter explained. The timing signal output of the timing recovery circuit 105 is processed by the smoothing filter 106, where singularities and anomalies of the signal are removed before being applied to detector subsystem 300A/B. The second output of the receiver subsystem 101 is the RSSI signal. It is digitized by A/D block 102 and then applied to detector subsystem 300A/B.

Similarly the received signal from antenna 200 is processed in receiver subsystem 201. The output of the receiver 201 is digitized by the analog to digital converter 203 before being downconverted to baseband by downconversion subsystem 204. The downconverted signal is applied to the timing recovery subsystem 205 and the data detector subsystem 300A/B. The output of the timing recovery block 205 is processed by the smoothing filter 206 before being applied to detector subsystem 300A/B. The second output of the receiver subsystem 201 is the RSSI signal which is digitized by A/D 202 before being applied to detector subsystem 300A/B. Each of the timing recovery subsystems 105, 205 can produce multiple timing references providing time diversity which are used to extract the desired data from the information signals captured at the spatially-diverse receiver subsystems 101, 102. The detector subsystem 300A/B must have sufficient capability to perform the needed processing.

DETECTOR USING A SINGLE BRANCH RECEIVER

Figure 2:
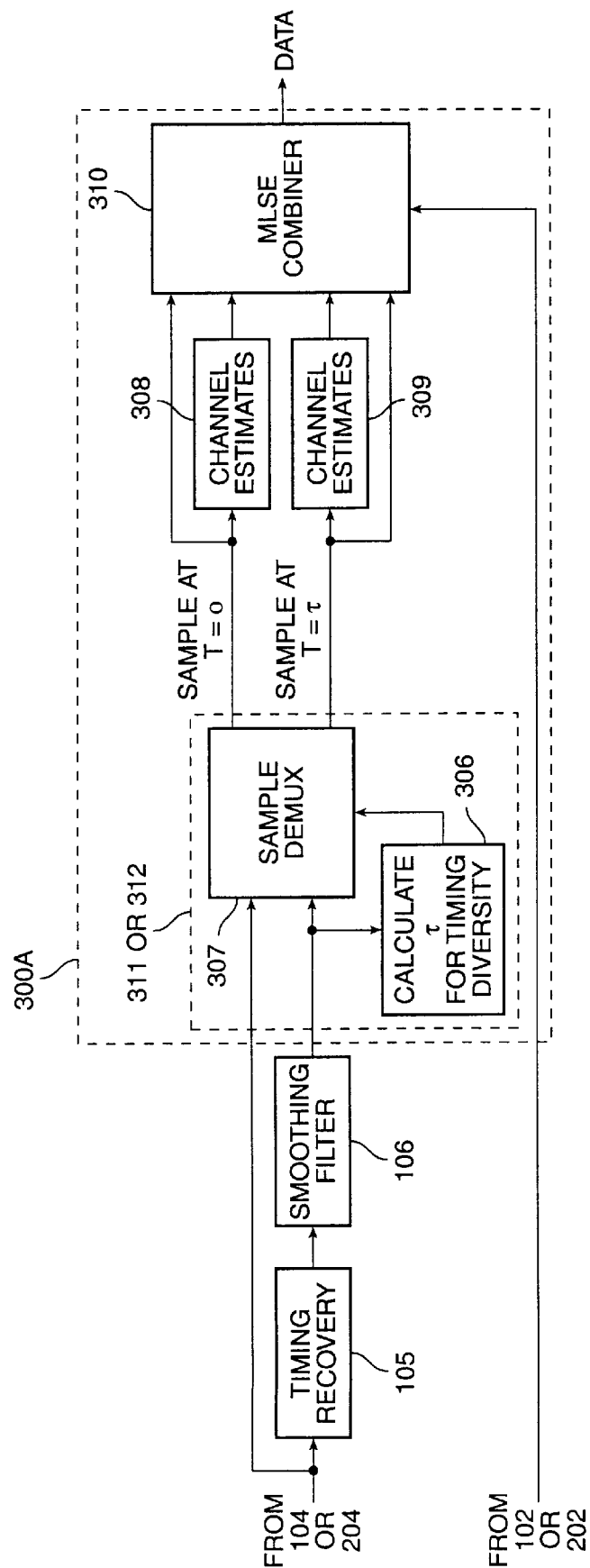
FIG. 2 is a block diagram showing a detector having time diversity and using MLSE for data recovery.

FIG. 2 shows the detail block diagram of a representative detector subsystem block 300A with the input elements of timing recovery 105 and smoothing filter 106. A parallel detector subsystem 300B is an identical structure. The output of the smoothing block 106 (or 206) is applied both to block 306 and 307. A third input to block 307 is the output of the block 104 or 204. In block 306 the time diversity is calculated and sent to block 307 where the samples for the main timing and diversity timing are selected. The samples for main timing are applied to block 308 for main channel estimations and the samples for diversity timing are applied to block 309 for diversity channel estimation. The output of both channel estimators 308 and 309 and the 307 block are applied to block 310. The output of the block 102 or 202 is also applied to block 310. Block 310 uses all the inputs and performs MLSE on both main and diversity times with a linear combining before detection. The channel estimation is based on the received signal phase since the amplitude information is removed by the hard limiter.

DETECTOR USING THE BEST RECEIVER BRANCH

Figure 3:
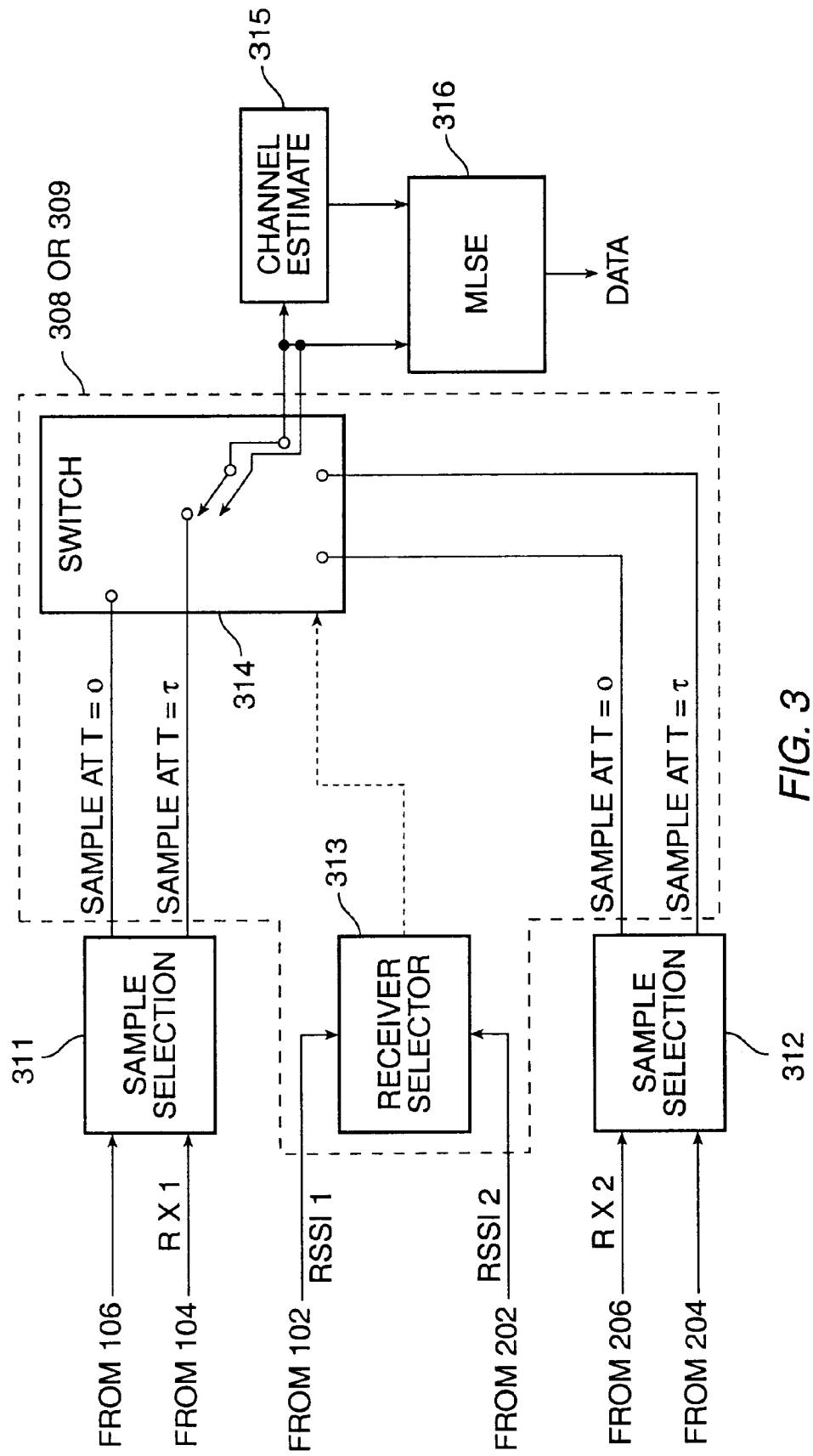
FIG. 3 is block diagram of a detector which operates on a selected channel chosen by a channel selector using RSSI signals.

In this configuration both receiver branches are processed. The results of processed signal from each branch including their associated RSSI's are applied to the detector block 300. FIG. 3 shows the detail block diagram of such a detector. The RSSI signals from A/Ds 102 and 202 are processed by block 313 using a selection algorithm to chose the receiver branch that has to be processed by the detector. The block 311 uses the outputs of blocks 104 and 106 to select the right samples to be used for channel estimation. Similarly block 312 processes the outputs of blocks 204 and 206 to select the appropriate samples to be used for channel estimation. The outputs of blocks 311 and 312 are applied to the switch block 314 which uses the output of the block 313 to select the appropriate receiver branch for the channel estimation block 315. The outputs of blocks 311 and 312 might be only the samples from the main timing instants or the samples from both the main and diversity timing instants. The output of the channel estimation block 315 and the switch block 314 are applied to the MLSE block 316 for the data detection.

DETECTOR USING BOTH RECEIVER BRANCHES

Figure 4:
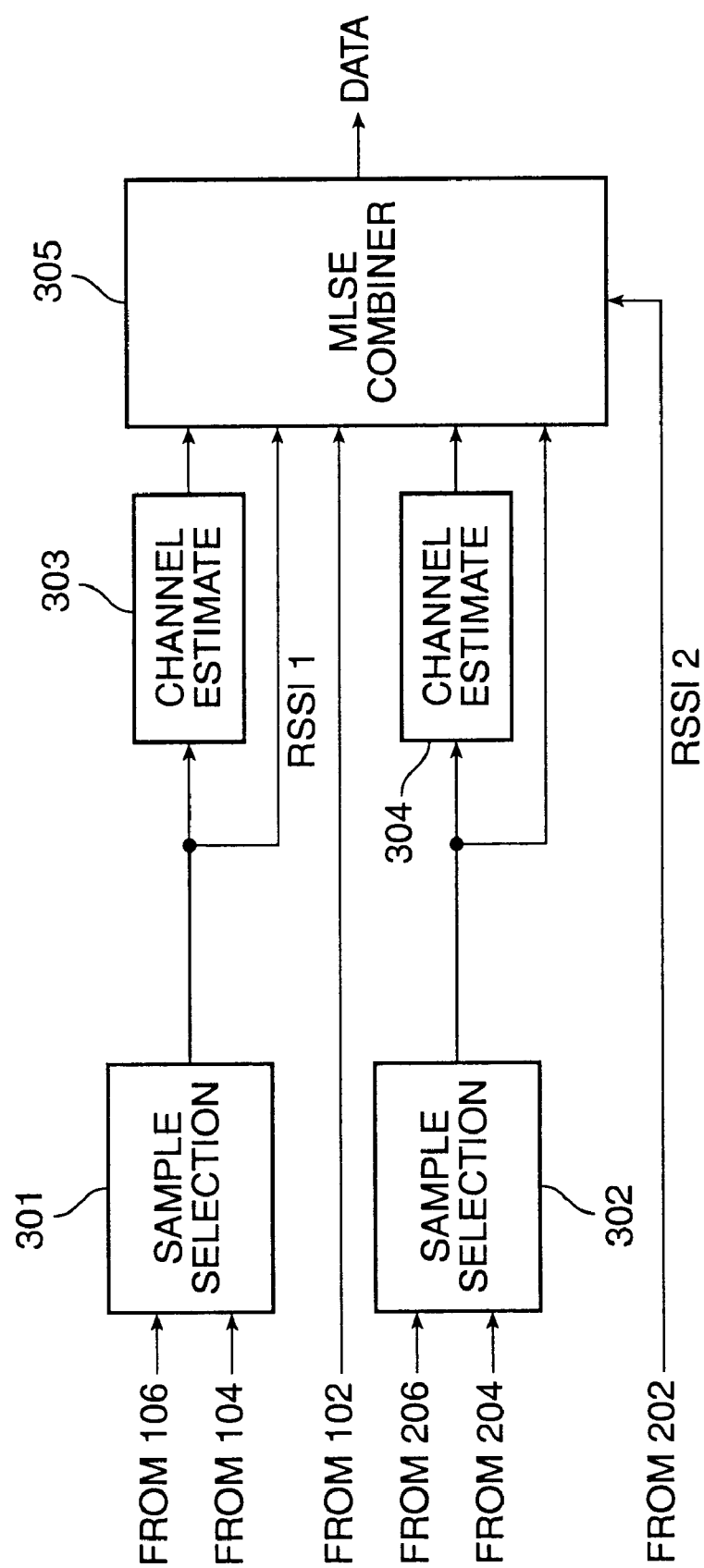
FIG. 4 is a block diagram of a detector using the information signal and RSSI signal of both main and diversity branches as input to an MLSE combiner.

In this configuration, both receiver branches are processed, and the inputs to the detector are the receiver branches signal and RSSL. FIG. 4 shows the detail block diagram of the detector for this configuration. The signals from downconverter 104 and smoothing filter 106 are applied to sample selector 301, which is within one embodiment of the detector 300A/B (FIG. 1). Sample selector 301 locates the main sample and the diversity sample and delivers them to channel estimator 303 for channel estimation. The output of the channel estimator 303 and sample selector 301, together with the RSSI signal from element 102, are applied to the specific embodiment of MLSE combiner 305. Similarly, the signals from elements 204 and 206 are applied to sample selector 302. Sample selector 302 finds the main sample and diversity sample and delivers them to channel estimator 304 for channel estimation. The output of the channel estimator 304 and sample selector 302, together with the RSSI signal from element 202, are applied to the MLSE combiner 305. The MLSE combiner 305 then processes the information from both branches and linearly combines the signals or information. The combined processed signal is then used for data detection.

RSSI SELECTION BLOCK

In the receiver, the process of receiver branch selection involves choosing segments of the received data burst for processing in the channel estimator and in the MLSE in order to avoid processing a segment that has been degraded by a signal fade. The selection algorithm examines the linearized RSSI sequences for each of the two receiver branches.

A simple form of branch selection is as follows:

1. Define a length of data segment (which will depends on the particular application, operating frequency, or speed of channel variation).
2. Average the linear RSSI over that data length. The following equation may be used (for each branch):

$Mb = \Sigma_{m=I1,I2} Rb(m) b=(1,2)$

Where Rb(m) is the linear RSSI sequence on branch b, and I1 an I2 are the start and the end indices of the data segment.
3. Choose the branch with the highest value Mb chosen for further processing by the channel estimator and the MLSE.

CHANNEL ESTIMATOR BLOCK

In a typical nonlinear receiver the amplitude information is lost and the ISI (Inter-Symbol Interference) information or channel impulse response must be obtained, if at all, from the phase information. The phase information in the phase comprises three terms: Data, ISI term and noise. By using the training sequence the data term can be cancelled. By averaging, the noise term can be canceled.

The received signal can be characterized as follows:

$$Y_i = h_0 x_i + h_i x_{i-1} + w_i = |y_i| e^{j \angle Y_i} \quad (1)$$

The channel is two-tap delay line and denotes the samples of additive Gaussian noise. In presence of a hard-limiter (nonlinear receiver) the received signal is:

$$e^{j \angle Y_i}$$

where

∠=Angle; and $\angle Y_i = \angle x_i + \angle h_o + \xi k$

Thus, the following likelihood function (metric) can be used for the MLSE.

$$M_{i,i-1} = \alpha_i^{0.5} |e^{j\angle Y_i} - e^{j\xi k}| \qquad (3)$$

where $\alpha_i$ is signal to noise power ratio which can be approximated by RSSI value.

Calculation of the above metric is done by estimating the phase of $h_o$ and the third term in above equation (2).

The second term is independent of the data so it can be estimated using all the received symbol while the third term is data dependent and is updated when the corresponding sequence is detected.

The update equations are given by:

$$\angle ho_{i+1} = (1-B)\angle ho_i + Be_i$$

where $\xi_k$ is updated using one of the following equations:

$$\xi k_{(i+1)} = (1-B)\xi k_i + Be_i$$

where $$e_i = \angle Y_i - \angle x_i - \xi k_i - \angle ho_i$$

and $k \in \{0,1,2,3\}$ depending on the $\angle x_i - \angle x_{i-1}$

B=forgetting factor

DIVERSITY TIMING BLOCK

The diversity timing is obtained from the output of the training sequence correlator. The output of the correlator can have 1. A sharp peak;
2. Two modest peaks;
3. A shallow peak; or
4. A sharp and a shallow peak.

In options 2 and 4 the main and diversity timing values are the times that the peaks occur. In option 1 the main and diversity timing values are the same. In option 3 the main timing value is the peak timing and the diversity timing value is the half T spaced value. T is the symbol period.

The invention has now been explained with reference to specific embodiments. Other embodiments will be apparent to those of ordinary skill in the art. It is therefore not intended that this invention be limited, except as indicated by the appended claims.

What is claimed is:

1. An adaptive equalizer for use with a radio signal received with spatial diversity comprising:

means for receiving said radio signal with a first spatial diversity;

means for receiving said radio signal with a second spatial diversity;

first timing recovery means coupled to receive said first spatial diversity radio signal for producing a first synchronous signal from said radio signal;

second timing recovery means coupled to receive said second spatial diversity radio signal for producing a second synchronous signal from said radio signal;

first smoothing filter coupled to receive said first synchronous signal for removing anomalous singularities of said first synchronous signal to produce a first timing signal;

second smoothing filter for removing anomalous singularities of said second synchronous signal to produce a second timing signal;

first means for calculating a first diversity timing value for said first spatial diversity signal;

second means for calculating a second diversity timing value for said second spatial diversity signal;

first sample demultiplexer coupled to receive said first timing signal, said first diversity timing value and said first spatial diversity signal for producing a first main signal sample and a first diversity signal sample;

second sample demultiplexer coupled to receive said second timing signal, said second diversity timing value and said second spatial diversity signal for producing a second main signal sample and a second diversity signal sample;

first channel estimator coupled to receive said first main signal sample for producing a first channel parameter estimate;

second channel estimator coupled to receive said first diversity signal sample for producing a second channel parameter estimate;

third channel estimator coupled to receive said second main signal sample for producing a third channel parameter estimate;

fourth channel estimator coupled to receive said second diversity signal sample for producing a fourth channel parameter estimate; and maximum likelihood sequence estimator coupled to receive said first main signal sample, said first channel parameter estimate, said first diversity signal sample, said second channel parameter estimate, said second main signal sample, said third channel parameter estimate, said second diversity signal sample, said fourth channel parameter estimate, a first received signal strength indicator signal, and a second received signal strength indicator signal for calculating first, second, third and fourth maximum likelihood metrics for first, second, third and fourth signal channels, for linearly combining said first, second, third and fourth maximum likelihood metrics into a single combined metric and for employing said single combined metric to extract data from said first main signal sample, from said first diversity signal sample, from said second main signal sample and from said second diversity signal sample.

2. An adaptive equalizer for use with a radio signal received with spatial diversity comprising:

means for receiving said radio signal with a first spatial diversity;

means for receiving said radio signal with a second spatial diversity;

first timing recovery means coupled to receive said first spatial diversity radio signal for producing a first synchronous signal from said radio signal;

second timing recovery means coupled to receive said second spatial diversity radio signal for producing a second synchronous signal from said radio signal;

first smoothing filter coupled to receive said first synchronous signal for removing anomalous singularities of said first synchronous signal to produce a first timing signal;

second smoothing filter for removing anomalous singularities of said second synchronous signal to produce a second timing signal;

first means for calculating a first diversity timing value for said first spatial diversity signal;

second means for calculating a second diversity timing value for said second spatial diversity signal;

a first sample demultiplexer coupled to receive said first timing signal, said first diversity timing value and said first spatial diversity signal for producing a first main signal sample and a first diversity signal sample;

a second sample demultiplexer coupled to receive said second timing signal, said second diversity timing value and said second spatial diversity signal for producing a second main signal sample and a second diversity signal sample;

a receiver selector coupled to receive a first received signal strength indicator signal from said first radio signal receiving means, to receive a second received signal strength indicator signal from said second radio signal receiving means for selecting between sources of signals on signal strength;

a first channel estimator coupled to receive said first or said second main signal sample, depending on signal strength, for producing a first channel parameter estimate;

a second channel estimator coupled to receive said first or said second diversity signal sample, depending on signal strength, for producing a second channel parameter estimate; and a maximum likelihood sequence estimator coupled to receive said first or second main signal sample, said first or second channel parameter estimate, said first or second diversity signal sample, for calculating first and second or third and fourth maximum likelihood metrics for first and second or third and fourth signal channels, linearly combining said first and second or said third and fourth maximum likelihood metrics into a single combined and employing said single combined metric to extract data from said first main signal sample and said first diversity signal sample, or from said second main signal sample and second diversity signal sample.

* * * * *